United States Patent
Lee et al.

(10) Patent No.: US 8,015,453 B2
(45) Date of Patent: Sep. 6, 2011

(54) SYSTEM AND METHOD FOR CORRECTING ERRORS IN DOWNLOADING WEB PAGES

(75) Inventors: Chung-I Lee, Taipei Hsien (TW); Hai-Hong Lin, Shenzhen (CN); De-Yi Xie, Shenzhen (CN); Hai-Yun Chen, Shenzhen (CN); Xi-Jin Xiao, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 144 days.

(21) Appl. No.: 12/550,781

(22) Filed: Aug. 31, 2009

(65) Prior Publication Data

US 2010/0125757 A1    May 20, 2010

(30) Foreign Application Priority Data

Nov. 14, 2008    (CN) .......................... 2008 1 0305547

(51) Int. Cl.
*G06F 11/00* (2006.01)

(52) U.S. Cl. ..................................... 714/47.1; 714/38.1
(58) Field of Classification Search .................. None
See application file for complete search history.

(56) References Cited

U.S. PATENT DOCUMENTS

| | | | | |
|---|---|---|---|---|
| 5,870,559 A * | 2/1999 | Leshem et al. | ................. | 709/224 |
| 6,633,912 B1 * | 10/2003 | Welter et al. | ................... | 709/224 |
| 6,895,551 B1 * | 5/2005 | Huang et al. | ................... | 715/205 |
| 7,254,526 B2 * | 8/2007 | Aupperle et al. | ............... | 703/27 |
| 7,444,548 B2 * | 10/2008 | Shane | ........................ | 714/38.14 |
| 7,624,173 B2 * | 11/2009 | Bary et al. | ..................... | 709/224 |
| 7,765,295 B2 * | 7/2010 | Anastas et al. | ................ | 709/224 |
| 7,827,271 B2 * | 11/2010 | Sankaran et al. | ............... | 709/223 |
| 2002/0013782 A1 * | 1/2002 | Ostroff et al. | .................... | 707/10 |
| 2002/0069378 A1 * | 6/2002 | McLellan et al. | ............... | 714/43 |
| 2002/0156799 A1 * | 10/2002 | Markel et al. | ................. | 707/202 |
| 2003/0195961 A1 * | 10/2003 | Breese et al. | ................. | 709/226 |
| 2004/0059809 A1 * | 3/2004 | Benedikt et al. | .............. | 709/224 |
| 2006/0253850 A1 * | 11/2006 | Bruno et al. | ................... | 717/173 |

* cited by examiner

*Primary Examiner* — Christopher McCarthy
(74) *Attorney, Agent, or Firm* — Altis Law Group, Inc.

(57) ABSTRACT

A system and method for correcting errors in downloading web pages provides a historic error resolving procedure and a common error resolving procedure. The historic error resolving procedure is for storing a download error and debugging solutions corresponding to the download error. The download error includes error positions and error types. The common error resolving procedure stores predefined error types and corresponding debugging solutions. If the download error of an error does not exist in the historic error resolving procedure, the common error resolving procedure is searched for the error types and corresponding debugging solutions. If the error type does not exist in the common error resolving procedure, an administrator is prompted to provide a new debugging solution to solve the error, and the new debugging solution is stored into the historic error resolving procedure.

9 Claims, 4 Drawing Sheets

| Error type | Solution |
|---|---|
| Server error: application programs in the Web server are closing | Try again after 30 seconds |
| Server error: Web server is busy | Try again after 30 seconds |
| Code page is lost | Executing the code page again |
| ... ... | ... ... |

FIG. 4

SYSTEM AND METHOD FOR CORRECTING ERRORS IN DOWNLOADING WEB PAGES

BACKGROUND

1. Technical Field

Embodiments of the present disclosure relate to web pages downloading systems and methods, and more particularly to a system and method for correcting errors in downloading web pages.

2. Description of Related Art

The Internet has become a medium for users to acquire information, where data may be displayed on a web page. A user may share information on the web page by downloading the web page as a file and sending the file to someone over a communication network. However, downloaded web pages may not open properly on other computers causing errors. For example, a web server that the web page hosted on may be so busy that cannot response to the web page.

Therefore, an effective system and method is needed to overcome the above-described shortcomings.

BRIEF DESCRIPTION OF THE DRAWINGS

FIG. 4 is a schematic diagram illustrating one embodiment of a common error resolving procedures.

DETAILED DESCRIPTION

All of the processes described below may be embodied in, and fully automated via, functional modules executed by one or more general purpose processors. The functional modules may be stored in any type of computer-readable medium or other computer storage device. Some or all of the methods may alternatively be embodied in specialized computer hardware or communication apparatus.

Figure 1:
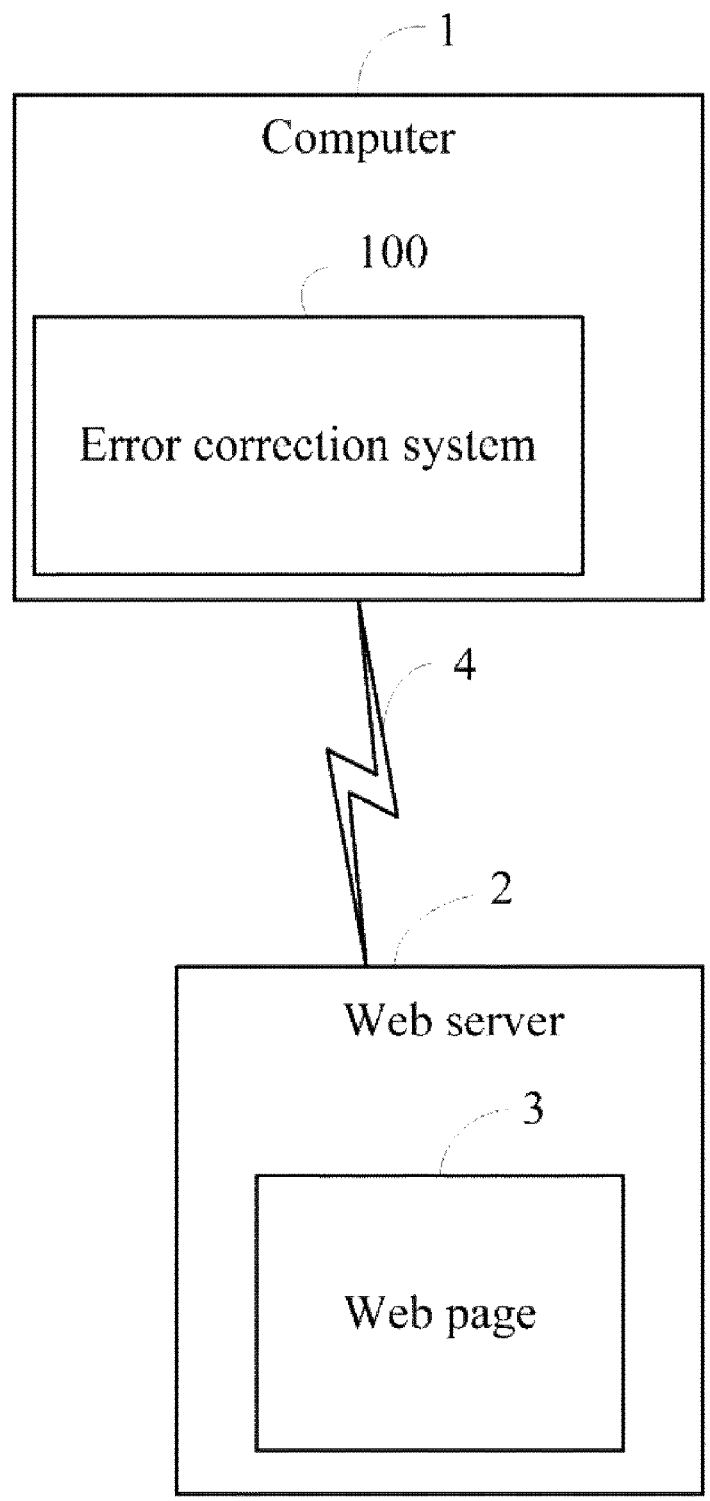
FIG. 1 is a block diagram of one embodiment of an error correction system for correcting errors in downloading web pages.

FIG. 1 is a block diagram of one embodiment of a computer 1 comprising an error correction system 100. The error correction system 100 may be used to correct errors when the computer 1 downloads a web page 3 over a communication network 4. In one embodiment, a web server 2 may host the web page 3.

Figure 2:
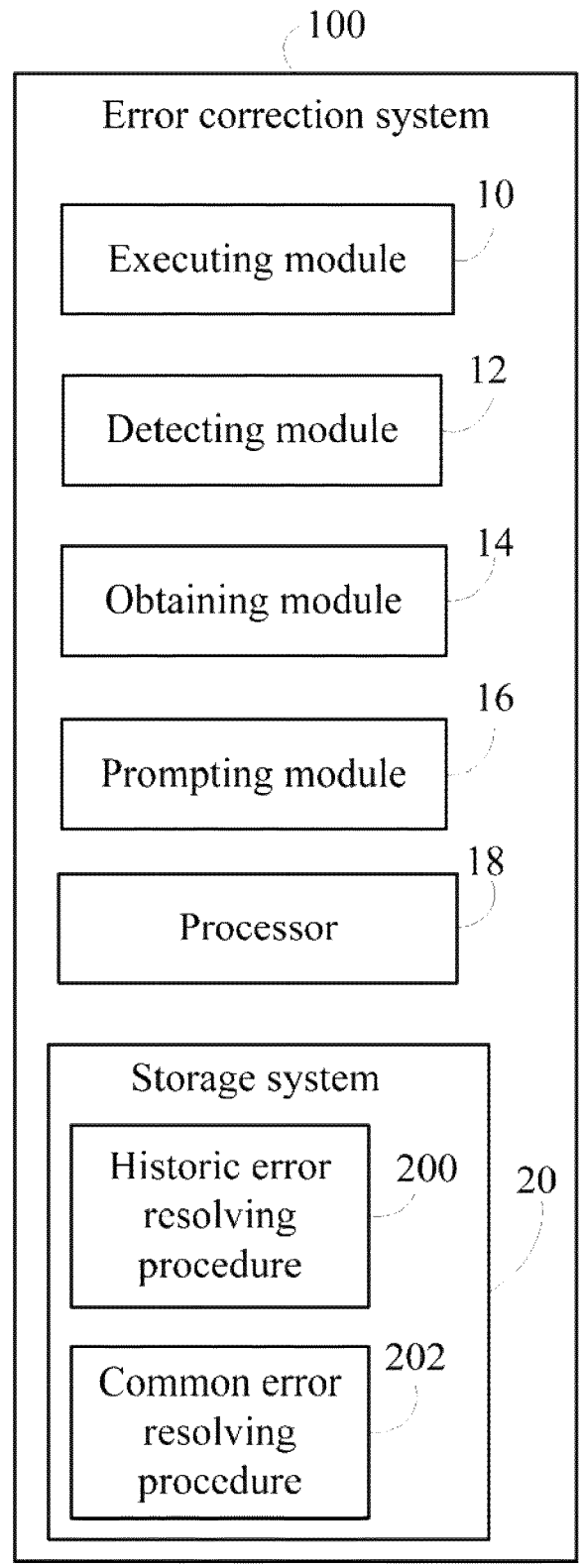
FIG. 2 is a block diagram of one embodiment of function modules of the error correction system in FIG. 1.

FIG. 2 is a block diagram of one embodiment of function modules of the error correction system 100 in FIG. 1. In one embodiment, the error correction system 100 may include an executing module 10, a detecting module 12, an obtaining module 14, and a prompting module 16. It may be understood that one or more specialized or general purpose processors, such as a processor 18, may be used to execute one or more computerized codes of the function modules 10-16. The one or more computerized codes of the functional modules 10-16 may be stored in a storage system 20.

The storage system 20 stores a historic error resolving procedure 200 and a common error resolving procedure 202. In one embodiment, the web page 3 corresponds to a historic error resolving procedure 200. The historic error resolving procedure 200 is a database that stores history information of download errors of the web page 3 (hereinafter, "error information") and corresponding debugging solutions. In one embodiment, the download errors may include error positions showing a position of the web page 3 of where the error occurs. Depending on the embodiment, the web page 3 may be downloaded as hypertext markup language (HTML) files. For example, when a sentence of the HTML files is being executed, an error may occur and the sentence is defined as the error position. The download errors may further include error types showing format errors or content errors, for example. The common error resolving procedure 202 is a database that stores predefined error types and corresponding predefined debugging solutions. For example, as shown in FIG. 4, the predefined error type may be a server error. The download errors recorded in the historic error resolving procedure 200 is about the errors which occur when the web page 3 was downloaded previously. The error types listed in the common error resolving procedures 202 are errors that commonly occur when downloading any web pages.

The executing module 10 communicates with the web server 2 to download the web page 3 over the communication network 4.

The detecting module 12 detects if the executing module 10 has downloaded the web page 3 successfully. If the web page 3 download fails, the executing module 10 sends error information of the failed download to the detecting module 12. The detecting module 12 searches if the download error of the error information is listed in the historic error resolving procedures 200. In one embodiment, the detecting module 12 needs to detect if an error type and an error position of the download error are listed in the historic error resolving procedures 200. For example, if an error of the web server 2 occurs when a sentence of the HTML files is executed, the web server 2 sends the error information of the failed download to the executing module 10. The executing module 10 sends the error information to the detecting module 12. The error information includes an error type and an error position. The error type is the error of the web server 2. The error position is the sentence.

The obtaining module 14 reads a debugging solution from the historic error resolving procedure 200 corresponding to the download error if the download error exists in the historic error resolving procedure 200.

The executing module 10 also resolves the errors by performing the debugging solution listed in the historic error resolving procedure 200 according to the error type, and downloads the web page 3 starting from the error position recorded in the download error.

If the download error does not exist in the historic error resolving procedure 200, the detecting module 12 further detects if the error type of the download error exists in the common error resolving procedure 202.

If the error type exists in the common error resolving procedure 202, the obtaining module 14 also obtains a debugging solution corresponding to the error type from the common error resolving procedure 202. The executing module 10 executes the debugging solution of the common error resolving procedure 202, downloads the web page 3 from the error position, and stores the download error and the debugging solution of the common error resolving procedure 202 into the historic error resolving procedure 200.

If the error type does not exist in the common error resolving procedure 202, the prompting module 16 prompts an administrator of the web server 2 to provide a new debugging solution to solve the error, and stores the download error and the new debugging solution into the historic error resolving procedure 200.

Figure 3:
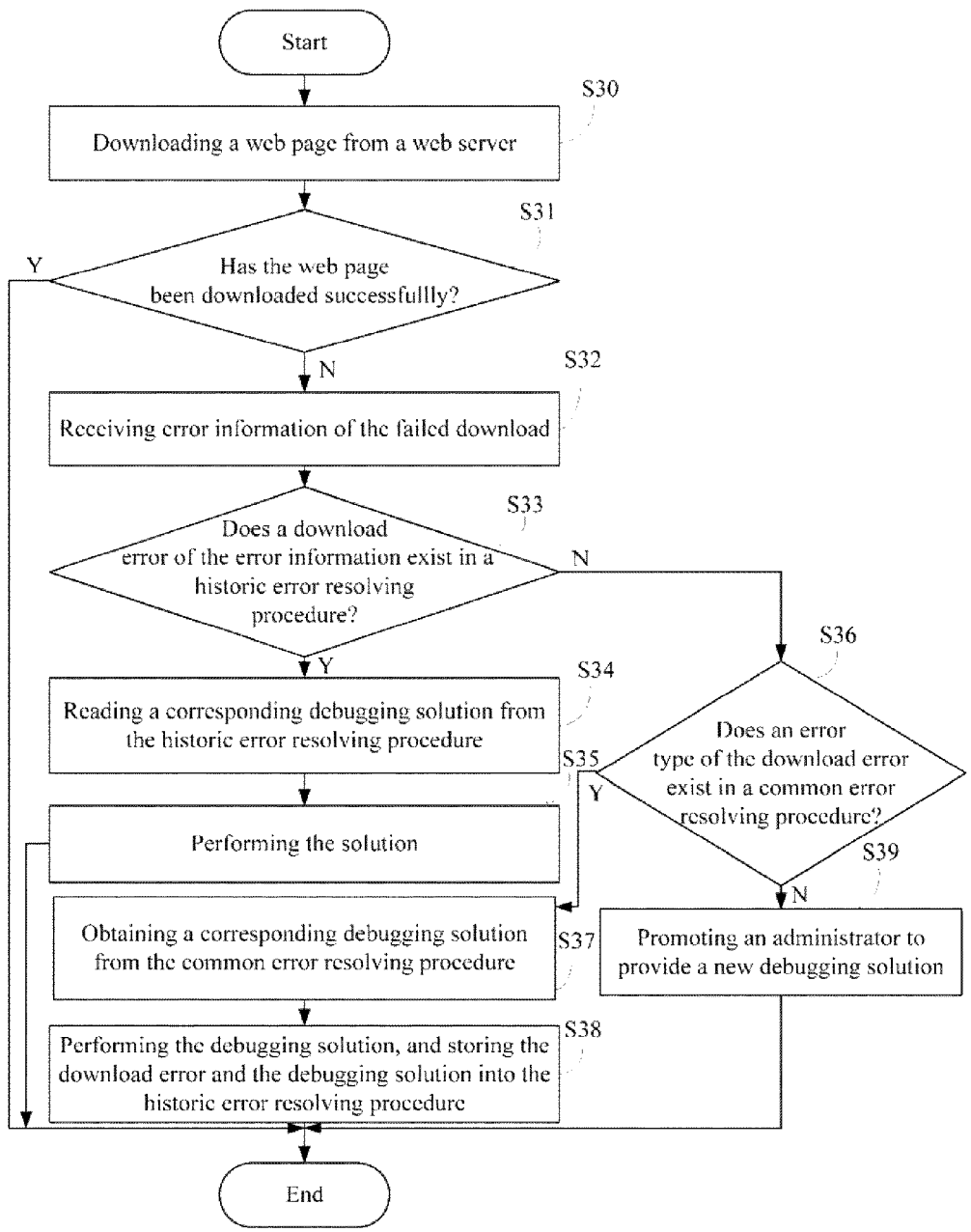
FIG. 3 is a flowchart of one embodiment of a method for correcting errors in downloading web pages.

FIG. 3 is a flowchart of one embodiment of a method for correcting errors in downloading web pages. Depending on the embodiment, additional blocks may be added, others removed, and the ordering of the blocks may be changed.

In block S30, the executing module 10 downloads the web page 3 over the communication server 4.

In block S31, the detecting module 12 detects if the web page 3 has been downloaded successfully. If the web page 3 has been downloaded successfully, the procedure ends. If the web page 3 fails to be downloaded, in block S32, the detecting module 12 receives error information of the failed download sent by the executing module 10.

In block S33, the detecting module 12 searches if the download error of the error information exits in the historic error resolving procedure 200. If the download error exists in the historic error resolving procedure 200, the procedure goes to block S34. If the download error does not exist in the historic error resolving procedure 200, the procedure goes to block S36.

In block S34, the obtaining module 14 reads a debugging solution corresponding to the download error from the historic resolving procedure 200.

In block S35, the executing module 10 resolves the error by performing the debugging solution listed in the historic error resolving procedure 200, and downloads the web page 3 starting from the error position recorded in the download error.

In block S36, the detecting module 12 detects if the error type of the download error exists in the common error resolving procedure 202. If the error type exits in the common error resolving procedure 202, the procedure goes to block S37. If the error type does not exist in the common error resolving procedure 202, the procedure goes to block S39.

In block S37, the obtaining module 14 obtains a debugging solution according to the error type from the common error resolving procedure 202, and the procedure goes to block S38.

In block S38, the executing module 10 executes the debugging solution of the common error resolving procedure 202, downloads the web page 3 starting from the error position, and stores the download error and the debugging solution of the common error resolving procedure 202 into the historic error resolving procedure 200.

In block S39, the prompting module 16 prompts an administrator to provide a new debugging solution to solve the error, and stores the download error and the new debugging solution into the historic error procedure 200.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A system for correcting errors in downloading web pages, the system comprising:
    a storage unit;
    at least one processor; and
    one or more programs stored in the storage unit and being executable by the at least one processor, the one or more programs comprising:
    an executing module to download a web page from a web server over a communication network, and sends a download error to a detecting module if the web page failed to be downloaded, the download error comprising an error position of the web page and an error type of the error position;
    the detecting module to detect if the download error exists in a historic error resolving procedure stored in the storage system, and detect if the error type exists in a common error resolving procedure stored in the storage system if the download error does not exist in the historic error resolving procedure;
    an obtaining module to obtain a debugging solution corresponding to the error type from the historic error resolving procedure or the common error resolving procedure; and
    the executing module further to resolve the error by performing the debugging solution, and download the web page starting from the error position again.

2. The system of claim 1, wherein the executing module is further to store the download errors and the debugging solution into the historic error resolving procedure if the debugging solution is obtained from the common error resolving procedures.

3. The system of claim 1, further comprising a prompting module to prompt an administrator of the web server to provide a new debugging solution to resolve the error, and store the download errors and the new debugging solution into the historic error resolving procedure.

4. A computer-based method for correcting errors in downloading web pages, the method comprising:
    (a) downloading a web page from a web server;
    (b) obtaining a download errors if the web page failed to be downloaded, the download errors comprising an error position of the web page and an error type of the error position;
    (c) detecting if the download error exists in a historic error resolving procedure stored in a storage system;
    (d) obtaining a debugging solution corresponding to the download error from the historic error resolving procedure, resolving the error by performing the debugging solution, and downloading the web page starting from the error position again if the download error exists in the historic error resolving procedure;
    (e) detecting if the error type exists in a common error resolving procedures stored in the storage system if the download error does not exist in the historic error resolving procedure;
    (f) obtaining a debugging solution corresponding to the error type from the common error resolving procedures, resolving the error by performing the debugging solution and downloading the web page starting from the error position again if the error type exists in the common error resolving procedures; and
    (g) prompting an administrator to provide a new debugging solution to resolve the error if the error type does not exist in the common error resolving procedure.

5. The method of claim 4, wherein step (d) further comprises: storing the download errors and the debugging solution into the historic error resolving procedure.

6. The method of claim 4, wherein step (f) further comprises: storing the download errors and the new debugging solution into the historic error resolving procedure.

7. A non-transitory computer-readable medium having stored therein instructions that, when executed by a computer, cause the computer to perform a method for correcting errors in downloading web pages, the method comprising:
    (a) downloading a web page from a web server;
    (b) obtaining a download errors if the web page failed to be downloaded, the download errors comprising an error position of the web page and an error type of the error position;
    (c) detecting if the download error exists in a historic error resolving procedure stored in a storage system;

(d) obtaining a debugging solution corresponding to the download error from the historic error resolving procedure, resolving the error by performing the debugging solution, and downloading the web page starting from the error position again if the download error exists in the historic error resolving procedure;

(e) detecting if the error type exists in a common error resolving procedures stored in the storage system if the download error does not exist in the historic error resolving procedure;

(f) obtaining a debugging solution corresponding to the error type from the common error resolving procedures, resolving the error by performing the debugging solution and downloading the web page starting from the error position again if the error type exists in the common error resolving procedures; and (g) prompting an administrator to provide a new debugging solution to resolve the error if the error type does not exist in the common error resolving procedure.

8. The non-transitory computer-readable medium of claim 7, wherein step (d) further comprises: storing the download error and the debugging solution into the historic error resolving procedure.

9. The non-transitory computer-readable medium of claim 7, wherein step (f) further comprises: storing the download error and the new debugging solution into the historic error resolving procedure.

* * * * *